March 27, 1934.   R. G. JEWELL   1,952,072
ELECTRICAL INSTRUMENT
Filed Feb. 12, 1932

Inventor:
Richard G. Jewell,
by Chas. V. Mullan
His Attorney.

Patented Mar. 27, 1934

1,952,072

UNITED STATES PATENT OFFICE 1,952,072

ELECTRICAL INSTRUMENT

Richard G. Jewell, Lynn, Mass., assignor to General Electric Company, a corporation of New York Application February 12, 1932, Serial No. 592,514

10 Claims. (Cl. 171—95)

My invention relates to electrical translating devices and instruments. An object of the invention is to provide arrangements for transforming alternating currents and voltages with variable ratios of transformation. Another object is to provide a measuring device in which the zero and lower portion of the scale are suppressed electrically. Other and further objects will become apparent as the description proceeds.

In accordance with my invention I provide a transformer with an auxiliary flux path paralleling the main flux path so as to link only one of the windings. The magnetic circuit is so arranged that the distribution of flux between the two paths varies as the excitation of the transformer is changed, thereby changing the ratio of transformation. Preferably this is accomplished by utilizing for the parallel flux paths materials having permeabilities which vary unequally with changes in magnetizing force. A transformer of this type may be interposed between an electrical circuit to be measured and a measuring instrument in order to modify the scale distribution of the instrument. By utilizing for the auxiliary flux path a material having a very high permeability relative to that of the main path and so dimensioning the magnetic circuits that the auxiliary path saturates at a predetermined value of transformer excitation, the instrument may be caused to deflect only a negligible amount for excitations below this predetermined value of excitation and to deflect relatively uniformly for variations in excitation above the saturating value. The features of my invention which I believe to be novel and patentable will be pointed out in the claims appended hereto.

Figure 1:
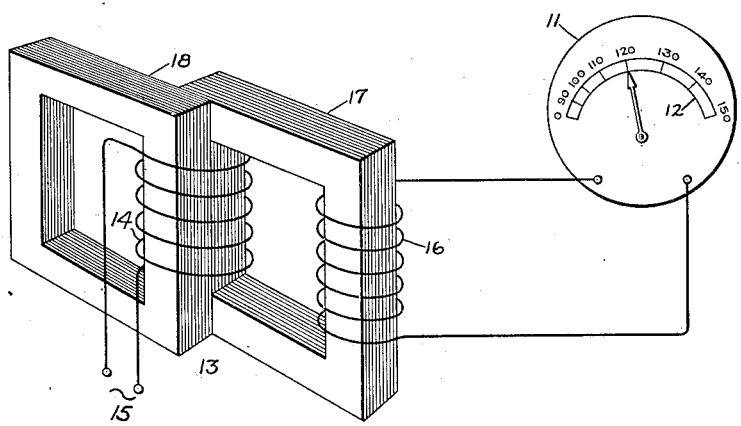
Figure 2:
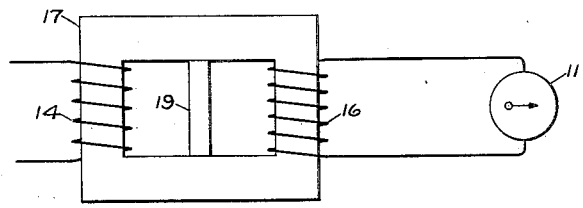
Figure 3:
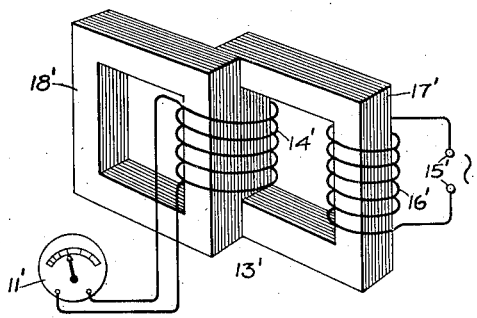

For a more complete understanding of my invention reference may be had to the accompanying drawing in which Fig. 1 represents one form of my invention arranged as a suppressed zero measuring device, Fig. 2 represents a modified construction and Fig. 3 represents a modified arrangement of the form shown in Fig. 1.

Referring more in detail to the drawing, 11 represents an instrument having a suppressed zero scale 12. The transformer 13 has a primary winding 14 supplied by an alternating-current circuit 15 and a secondary winding 16 connected to the instrument 11. The main core 17 composed of any suitable material, for example, ordinary transformer steel, is in inductive relation with transformer windings 14 and 16. An auxiliary core 18 is provided which offers to the flux induced by coil 14 an alternative path not in inductive relation with coil 16. Auxiliary core 18 is preferably composed of a substance having a high permeability under low magnetizations but which saturates quickly with increased magnetization. For example, I may employ a nickel iron alloy containing approximately 78½ per cent nickel such as is described in U. S. Patent No. 1,586,884 to Elmen.

With relatively low excitation, owing to the lower reluctance of core 18 resulting from its high permeability, nearly all the transformer flux will flow in core 18. Furthermore, the fraction of flux which might tend to flow in core 17 is almost wholly suppressed by the winding 16 which is closed through instrument 11. Accordingly, insufficient current is induced in coil 16 to appreciably deflect the instrument. When the excitation is such that the core 18 becomes saturated, however, flux is forced through core 17 and the instrument 11 deflects an amount dependent upon the excess of the transformer excitation over that required to saturate core 18.

Although I have shown an arrangement in which a complete auxiliary circuit of high permeability low saturating material is presented to the transformer flux, it will be understood that I am not limited to this exact arrangement. A similar effect may also be obtained if only a portion of the parallel circuit is composed of high permeability low saturating magnetic material. For example, in the arrangement shown in Fig. 2, a bridge 19 of high permeability material is provided between the legs of the main core 17 on which the primary and secondary windings 14 and 16 are wound.

It will be understood that the ratio of turns of the primary and secondary windings 14 and 16 will be such as to give the ratio of maximum voltages or currents desired. Inasmuch as my device serves as a transformer as well as an arrangement for modifying the scale distribution of an instrument, the use of my device obviates the necessity for using an instrument transformer when measuring electrical quantities which would be beyond the range of the instrument 11. By suitable change in electrical design the arrangement may be used either as a potential transformer or as a current transformer, it being understood that different calibrations might be required for the instrument 11.

While I have shown an arrangement in which the winding 14 is connected to a source of current and the winding 16 is connected to an indicating instrument 11, it will be understood that my invention is not limited to this precise arrangement of the windings. For example, as shown in Fig. 3, the relative positions of the source of current 15 and the indicating device 11 or some other suitable translating device may be interchanged.

The connections shown in Fig. 3 are preferable with the device used as a current transformer. The operation with this connection is as follows: With a given current $I_1$ in winding 16' a flux is set up in a core 17' which links the winding 14'. Winding 14' is closed through an instrument 11' or other suitable device. Some current $I_2$ will flow in winding 14' and the direction as given by Lenz's law is such as to oppose the flux in core 17'. Since core 18' also links the coil 14', it then has a flux in it which is opposite to that of the flux in core 17'; and since core 18' has a lower reluctance than core 17', the flux in core 18' is almost equal in magnitude to that in core 17' when current $I_2$ has a much smaller value than $I_1$. The current in winding 14' is thus limited. This condition exists as long as core 18' is unsaturated. After core 18' saturates its flux will no longer increase with a small increase in $I_2$, hence $I_2$ must increase nearly the same as $I_1$. The system arranged in this manner also therefore operates as a suppressed-zero device.

Although I have described the use of a variable ratio transformer in conjunction with measuring circuits, it will be understood that the transformer itself has properties making it useful for numerous other applications as well. It will be seen that I have provided a transformer in which the ratio of transformation taken as the ratio of primary to secondary voltages or currents decreases as the primary excitation increases. In other words, the secondary voltage will tend to rise out of proportion to the primary voltage as the primary excitation is increased.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the appended claims.

What I claim as new and desire to secure by Letters Patent of the United States, is:

1. In combination with an alternating-current circuit, an electrical device and a transformer having primary and secondary windings and parallel separate complete magnetic circuits one of which is composed of high permeability material and is proportioned to become saturated within the operating range of the device, said primary winding being connected to said alternating-current circuit and liking both of said parallel magnetic circuits, said secondary winding being connected to said device and linking only one of said magnetic circuits.

2. In combination with an alternating-current circuit, a suppressed zero measuring device comprising an electrical instrument and a transformer having primary and secondary windings and main and auxiliary magnetic circuits in parallel arranged to have their relative permeabilities vary unequally with variations in transformer excitation so as to cause the flux density in the main magnetic circuit to remain negligible until the measured quantity attains a value corresponding to a point in the lower portion of the range of the device, the primary winding of said transformer being connected to said alternating-current circuit and linking both of said parallel magnetic circuits, and the secondary winding of said transformer being connected to said instrument and linking only the main magnetic circuit, said main magnetic circuit comprising a continuous path of magnetic material.

3. In combination with an alternating-current system, a transformer having a ratio varying with its excitation, comprising primary and secondary windings and main and auxiliary parallel magnetic circuits, one of which is composed of a material having a relatively high permeability but which becomes saturated at a relatively low value of transformer excitation, said primary winding being connected to the alternating-current system and linking both of said magnetic circuits and said secondary winding linking only the main magnetic circuit, said main magnetic circuit being composed wholly of magnetic material.

4. In combination with an alternating-current circuit, a suppressed zero measuring device comprising an electrical instrument and a transformer having primary and secondary windings and main and auxiliary magnetic cores, said auxiliary core having the smaller reluctance and being composed of a relatively high permeability material but becoming saturated at a value of transformer excitation corresponding to a point in the lower portion of the range of the device, said primary winding being connected to said alternating-current circuit and linking both of said magnetic cores and said secondary winding being connected to said instrument and linking only the main magnetic core.

5. In combination with an alternating-current system, a current responsive device and a transformer having primary and secondary windings and a magnetic core providing two complete magnetic circuits in parallel, said magnetic circuits being composed of continuous paths through materials having permeabilities which vary unequally with variations in magnetic field strength, said primary winding being connected to the alternating-current system and linking both of said magnetic circuits, said secondary winding being connected to said current responsive device and linking only one of said magnetic circuits.

6. In combination with an alternating-current circuit, a transformer the ratio of which varies with its excitation, said transformer comprising primary and secondary windings and main and auxiliary magnetic cores providing continuous closed magnetic paths and composed of materials having permeabilities which vary unequally with variations in magnetic field strength, said primary winding being connected to the alternating-current circuit and linking both of said magnetic circuits, said secondary winding linking only the main magnetic circuit.

7. In combination with an alternating-current circuit, a variable ratio transformer, the secondary voltage of which increases more rapidly with increasing excitation than the excitation voltage, said transformer comprising primary and secondary windings and main and auxiliary magnetic circuits composed of continuous paths through materials having permeabilities which vary unequally with variations in magnetic field strength, said primary winding being connected to the alternating-current circuit and linking both of said magnetic circuits, said secondary winding linking only the main magnetic circuit.

8. In combination with an alternating-current circuit, a suppressed zero measuring device comprising an electrical instrument and a transformer having windings connected to said alternating-current circuit and said electrical instrument respectively and having main and auxiliary magnetic cores, said auxiliary core having the smaller reluctance and being composed of a relatively high permeability material but becoming saturated at a value of magnetizing force corresponding to a point in the lower portion of the range of the device, one of said windings linking both of said magnetic cores and the other of said windings linking only the main magnetic core.

9. In combination with an alternating-current circuit, an electrical device and a transformer having primary and secondary windings, a main magnetic circuit wholly through magnetic material and linking both windings, and an auxiliary magnetic circuit which becomes saturated within the operating range of the device and links only said secondary winding, said primary winding being connected to said alternating-current circuit, said secondary winding being connected to said device.

10. In combination with an alternating-current circuit, a suppressed zero measuring device comprising an electrical instrument and a transformer having primary and secondary windings and main and auxiliary magnetic cores, said auxiliary core having a smaller reluctance and being composed of a relatively high permeability material but becoming saturated at a value of magnetic field strength corresponding to a point in the lower portion of the range of the device, said primary winding being connected to said alternating-current circuit and linking only the main magnetic core and said secondary winding being connected to said instrument and linking both of said magnetic cores.

RICHARD G. JEWELL.